US008854990B1

(12) United States Patent
Baigal

(10) Patent No.: US 8,854,990 B1
(45) Date of Patent: Oct. 7, 2014

(54) MULTIPLE CONCURRENT CALL SESSIONS OVER A SINGLE VOICE CALL ACCOUNT

(75) Inventor: Steven Baigal, Clarksburg, MD (US)

(73) Assignee: Marvell International Ltd., Hamilton (BM)

( * ) Notice: Subject to any disclaimer, the term of this patent is extended or adjusted under 35 U.S.C. 154(b) by 1691 days.

(21) Appl. No.: 12/184,266

(22) Filed: Aug. 1, 2008

Related U.S. Application Data

(60) Provisional application No. 60/955,944, filed on Aug. 15, 2007.

(51) Int. Cl.
 - *H04W 84/02* (2009.01)
 - *H04W 88/02* (2009.01)
 - *H04W 88/00* (2009.01)

(52) U.S. Cl.
 USPC ............................ 370/252; 370/229; 370/913

(58) Field of Classification Search
 None
 See application file for complete search history.

(56) References Cited

U.S. PATENT DOCUMENTS

| | | | |
|---|---|---|---|
| 7,593,325 B1 * | 9/2009 | Croak et al. .................. | 370/229 |
| 2002/0072354 A1 * | 6/2002 | Kundaje et al. ............... | 455/416 |
| 2003/0215078 A1 * | 11/2003 | Brahm et al. ............ | 379/211.02 |
| 2004/0156313 A1 * | 8/2004 | Hofmeister et al. .......... | 370/229 |
| 2006/0229093 A1 * | 10/2006 | Bhutiani et al. .............. | 455/518 |
| 2006/0291455 A1 * | 12/2006 | Katz et al. ..................... | 370/355 |
| 2007/0280464 A1 * | 12/2007 | Hughes et al. ........... | 379/205.01 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Asad Nawaz
*Assistant Examiner* — Jason Harley

(57) ABSTRACT

A cordless telephone base unit includes first and second network controllers and a terminal controller. The first network controller establishes concurrent call sessions for a single voice call account with a service provider over the Internet. Each of the concurrent call sessions includes at least one media session. Each of the media sessions has a corresponding software port number. The second network controller wirelessly communicates with cordless telephones, which each have a corresponding IP address. The terminal controller connects each of the media sessions to one or more of the cordless telephones and includes a switch logic that implements a terminal map, and a switch fabric that connects the cordless telephones with the media sessions according to the terminal map. The terminal map associates the corresponding IP address of each of the cordless telephones with the corresponding software port numbers of one or more of the media sessions.

10 Claims, 5 Drawing Sheets

(56) References Cited

OTHER PUBLICATIONS

IEEE P802.11g/D8.2, Apr. 2003 (Supplement to ANSI/IEEE Std 802.11-1999(Reaff 2003)); DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11e/D11.0, Oct. 2004 (Amendment to ANSI/IEEE Std 802.11®—1999 (2003 Reaff) edition as amended by IEEE Std 802.11g-2003, IEEE Stad 802.11h-2003 and IEEE 802.11i-2004) IEEE Standard for Information Technology—Telecommunications and information exchange between systems—Local and metropolitan area networks—Specific requirements; Part 11: Wireless Medium Access Control (MAC) and Physical Layer (PHY) specifications: Amendment 7: Medium Access Control (MAC) Quality of Service (QoS) Enhancements; Sponsor LAN/MAN Committee of the IEEE Computer Society; 185 pages.

IEEE P802.11i/D10.0, Apr. 2004; (Amendment to ANSI/IEEE Std 802.11®-1999 (2003 Reaff) edition as amended by IEEE Std 802.11g-2003 and IEEE Std 802.11h-2003); IEEE Standard for Information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements; Sponsor LAN/MAN Committee of the IEEE Computer Society; 178 pages.

IEEE P802.11K™/D10.0, Nov. 2007; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 1: Radio Resource Measurement of Wireless LAN's; Sponsor LAN/MAN Standards Committee of the IEEE Computer Society; 223 pages.

IEEE P802.11v/D1.02, Sep. 2007; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Wireless Network Management; 204 pages.

IEEE P802.11w™/D4.0, Nov. 2007; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Protected Management Frames; Prepared by IEEE 802 Committee of the IEEE Computer Society; 55 pages.

\* cited by examiner

MULTIPLE CONCURRENT CALL SESSIONS OVER A SINGLE VOICE CALL ACCOUNT

CROSS-REFERENCE TO RELATED APPLICATIONS

This application claims the benefit of U.S. Provisional Patent Application Ser. No. 60/955,944 filed Aug. 15, 2007, the disclosure thereof incorporated by reference herein in its entirety.

BACKGROUND

The present disclosure relates generally to data communications. More particularly, the present disclosure relates to call sessions for voice call accounts.

As broadband data communications networks have proliferated, voice call services such as VoIP services are rapidly replacing conventional public switched telephone networks (PSTN) for making telephone calls. In conventional VoIP communications, a single phone account is associated with a single phone device and, a single VoIP session permits only one telephone call at a time. Therefore, if a consumer wishes to have multiple concurrent telephone calls, the consumer must purchase multiple VoIP telephone accounts, each having a separate telephone number, and each supported by a separate VoIP session.

SUMMARY

In general, in one aspect, an embodiment features an apparatus comprising: a first network controller adapted to establish a plurality of concurrent call sessions for a single voice call account, wherein each of the concurrent call sessions includes at least one media session; and a terminal controller adapted to connect each of the media sessions to one or more of a plurality of media terminals.

Embodiments of the apparatus can include one or more of the following features. In some embodiments, at least one of the concurrent call sessions includes a voice over Internet Protocol (VoIP) session. In some embodiments, the first network controller comprises: a signaling session controller adapted to establish a respective signaling session for each of the concurrent call sessions; and a media session controller adapted to establish the media sessions. In some embodiments, the terminal controller comprises: a switch logic adapted to implement a terminal map, wherein the terminal map associates each of the media terminals with one or more of the media sessions; and a switch fabric adapted to connect each of the media terminals with one or more of the media sessions according to the terminal map. In some embodiments, the terminal controller comprises: a second network controller adapted to communicate with the media terminals over a second network. In some embodiments, the second network controller comprises at least one of: a local-area network (LAN) controller adapted to communicate with the media terminals over a LAN; a wireless local-area network (WLAN) controller adapted to communicate with the media terminals over a WLAN; and a personal-area network (PAN) controller adapted to communicate with the media terminals over a PAN. In some embodiments, the WLAN controller is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise an access point comprising the apparatus. Some embodiments comprise a cordless telephone comprising the apparatus. In some embodiments, each of the media sessions comprises at least one of: a voice session; a music session; and a video session.

In general, in one aspect, an embodiment features an apparatus comprising: first network controller means for establishing a plurality of concurrent call sessions for a single voice call account, wherein each of the concurrent call sessions includes at least one media session; and terminal controller means for connecting each of the media sessions to one or more of a plurality of media terminals. In some embodiments, at least one of the concurrent call sessions includes a voice over Internet Protocol (VoIP) session.

Embodiments of the apparatus can include one or more of the following features. In some embodiments, the first network controller means comprises: signaling session controller means for establishing a respective signaling session for each of the concurrent call sessions; and media session controller means for establishing the media sessions. In some embodiments, the terminal controller means comprises: switch logic means for implementing a terminal map, wherein the terminal map associates each of the media terminals with one or more of the media sessions; and switch fabric means for connecting each of the media terminals with one or more of the media sessions according to the terminal map. In some embodiments, the terminal controller means comprises: second network controller means for communicating with the media terminals over a second network. In some embodiments, the second network controller means comprises at least one of: local-area network (LAN) controller means for communicating with the media terminals over a LAN; wireless local-area network (WLAN) controller means for communicating with the media terminals over a WLAN; and personal-area network (PAN) controller means for communicating with the media terminals over a PAN. In some embodiments, the WLAN controller is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise an access point comprising the apparatus. Some embodiments comprise a cordless telephone comprising the apparatus. In some embodiments, each of the media sessions comprises at least one of: a voice session; a music session; and a video session.

In general, in one aspect, an embodiment features a computer program comprising: instructions for establishing a plurality of concurrent call sessions for a single voice call account, wherein each of the concurrent call sessions includes at least one media session; and instructions for connecting each of the media sessions to one or more of a plurality of media terminals.

Embodiments of the computer program can include one or more of the following features. In some embodiments, at least one of the concurrent call sessions includes a voice over Internet Protocol (VoIP) session. Some embodiments comprise instructions for establishing a respective signaling session for each of the concurrent call sessions; and instructions for establishing the media sessions. Some embodiments comprise instructions for implementing a terminal map, wherein the terminal map associates each of the media terminals with one or more of the media sessions; and instructions for connecting each of the media terminals with one or more of the media sessions according to the terminal map. Some embodiments comprise instructions for communicating with the media terminals over a second network. In some embodiments, the instructions for communicating with the media terminals over the second network comprise at least one of: instructions for communicating with the media terminals over a local-area network (LAN); instructions for communicating with the media terminals over a wireless local-area network (WLAN); and instructions for communicating with the media terminals over a personal-area network (PAN). In some embodiments, the WLAN is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, each of the media sessions comprises at least one of: a voice session; a music session; and a video session.

In general, in one aspect, an embodiment features a method comprising: establishing a plurality of concurrent call sessions for a single voice call account, wherein each of the concurrent call sessions includes at least one media session; and connecting each of the media sessions to one or more of a plurality of media terminals. In some embodiments, at least one of the concurrent call sessions includes a voice over Internet Protocol (VoIP) session.

Embodiments of the method can include one or more of the following features. Some embodiments comprise establishing a respective signaling session for each of the concurrent call sessions; and establishing the media sessions. Some embodiments comprise implementing a terminal map, wherein the terminal map associates each of the media terminals with one or more of the media sessions; and connecting each of the media terminals with one or more of the media sessions according to the terminal map. Some embodiments comprise communicating with the media terminals over a second network. In some embodiments, communicating with the media terminals over the second network comprises at least one of: communicating with the media terminals over a local-area network (LAN); communicating with the media terminals over a wireless local-area network (WLAN); and communicating with the media terminals over a personal-area network (PAN). In some embodiments, the WLAN is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, each of the media sessions comprises at least one of: a voice session; a music session; and a video session.

The details of one or more implementations are set forth in the accompanying drawings and the description below. Other features will be apparent from the description and drawings, and from the claims.

Figure 1:
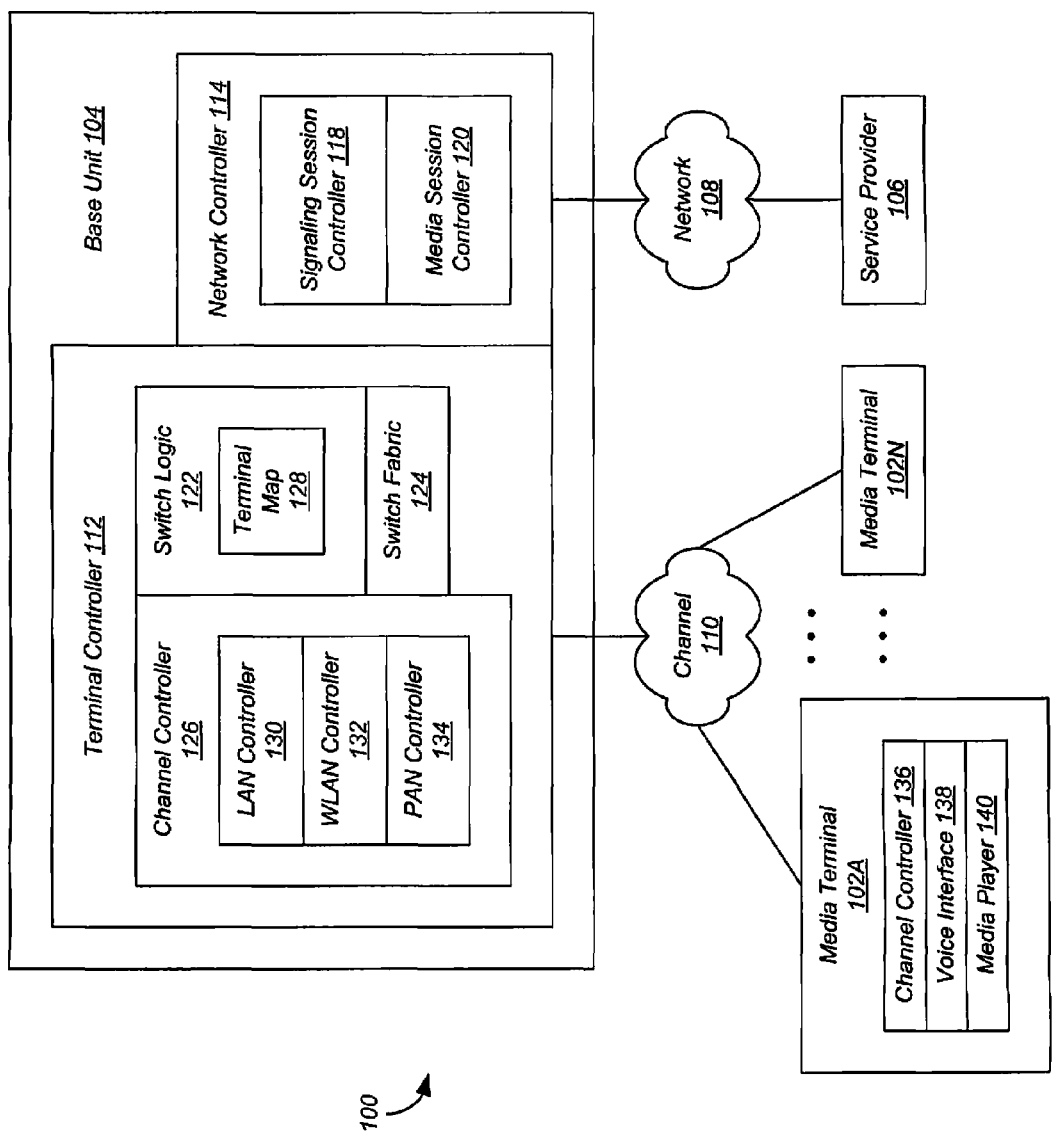
FIG. 1 shows a media system including a base unit according to one embodiment.

The leading digit(s) of each reference numeral used in this specification indicates the number of the drawing in which the reference numeral first appears.

DETAILED DESCRIPTION

The present disclosure describes embodiments which establish multiple concurrent call sessions over a single voice call account. Each call session can include a voice call, music session, video session, and the like. Each call session can be connected with a separate media terminal. The media terminal connections can include wired connections, optical connections, wireless connections, and the like. The wireless connections can include WiFi, Bluetooth, and the like.

FIG. 1 shows a media system 100 according to one embodiment. Although in the described embodiments, the elements of media system 100 are presented in one arrangement, other embodiments may feature other arrangements, as will be apparent to one skilled in the relevant arts based on the disclosure and teachings provided herein. For example, the elements of media system 100 can be implemented in hardware, software, or combinations thereof.

Referring to FIG. 1, media system 100 includes one or more media terminals 102A-N, a base unit 104, and a service provider 106. Base unit 104 communicates with service provider 106 over a network 108 such as the Internet. Service provider 106 can establish voice call accounts to provide services such as voice over Internet Protocol (VoIP) services, media delivery services to deliver media such as music and video, and the like. In some embodiments, base unit 104 is implemented as a cordless telephone base unit, and media terminals 102 are implemented as cordless telephones.

Base unit 104 communicates with media terminals 102 over a channel 110. In some embodiments, channel 110 includes wired connections. The wired connections can be implemented as a network, direct links, or the like. For example, channel 110 can be implemented as a wired local-area network (LAN) such as an Ethernet LAN. In some embodiments, channel 110 includes wireless connections. The wired connections can be implemented as a network, direct links, or the like. For example, the direct links can include conventional wireless links such as Digital Enhanced Cordless Telecommunications (DECT) links and the like. As another example, the wireless network can be implemented as an IEEE 802.11 WiFi network, as a Bluetooth network, and the like. Channel 110 can also include other sorts of connections such as optical connections and the like. When the wireless network is implemented as a WiFi network, base unit 104 can be implemented as an access point.

Base unit 104 includes a terminal controller 112 in communication with media terminals 102 and a network controller 114 in communication with service provider 106. Network controller 114 includes a signaling session controller 118, and a media session controller 120. Terminal controller 112 includes a switch logic 122, a switch fabric 124, and a channel controller 126. Switch logic 122 implements a terminal map 128. Terminal map 128 can be implemented as a table stored in a memory.

When channel 110 is implemented as a network, channel controller 126 can be implemented as a local network controller. For example, channel controller 126 can include one or more of a local-area network (LAN) controller 130 adapted to communicate with media terminals 102 over a LAN, a wireless local-area network (WLAN) controller 132 adapted to communicate with media terminals 102 over a WLAN, and a personal-area network (PAN) controller 134 adapted to communicate with the media terminals over a PAN such as a Bluetooth network. WLAN controller 132 can be compliant with all or part of IEEE standard 802.11, including draft and approved amendments 802.11a, 802.11b, 802.11e, 802.11g, 802.11i, 802.11k, 802.11n, 802.11v, and 802.11w.

Each media terminal 102 can be implemented as any of a wide variety of devices such as corded telephones, cordless telephones, mobile telephones, smart phones, pocket PCs, and the like. Each media terminal 102 can include a channel controller 136, a voice interface 138, a media player 140, and the like. Although in FIG. 1 these elements are shown only for media terminal 102A, they can be included in each media terminal 102.

Figure 2:
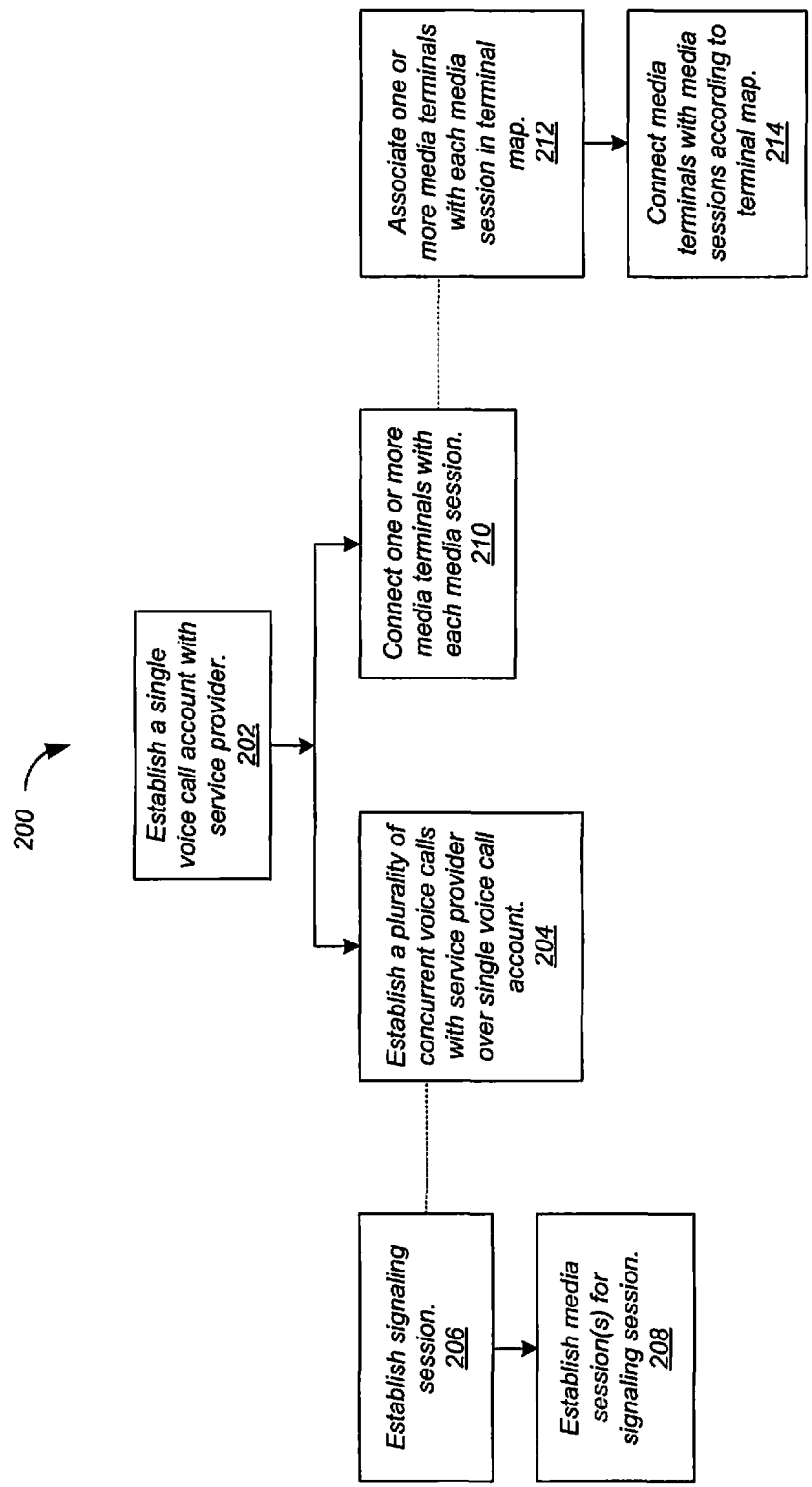
FIG. 2 shows a process for the base unit of FIG. 1 according to one embodiment.

FIG. 2 shows a process 200 for base unit 104 of FIG. 1 according to one embodiment. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, network controller 114 of base unit 104 establishes a single voice call account with service provider 106 (step 202). The voice call account can be a voice over Internet Protocol (VoIP) account.

Network controller 114 then establishes a plurality of concurrent call sessions with service provider 106 over the single voice call account (step 204). Each of the concurrent call sessions can be initiated by network controller 114 or service provider 106. For example, network controller 114 can initiate a call session in response to the use of a media terminal 102 to place a telephone call, to download, upload or stream media such as music or video, and the like. As another example, service provider 106 can initiate a call session to connect an inbound telephone call to base unit 104.

The call sessions can be established simultaneously, for example when two or more media terminals 102 place telephone calls simultaneously. The call sessions can also be established sequentially and contemporaneously, for example when one media terminal 102 places a call during another call involving another media terminal 102.

To establish each call session, signaling session controller 118 of network controller 114 first establishes a signaling session (step 206). For example, signaling session controller 118 can establish the signaling session using Session Initiation Protocol (SIP), ITU-T H.225.0 protocol, and the like. Then media session controller 120 of network controller 114 establishes one or more media sessions for the signaling session (step 208). For example, media session controller 120 can establish the media session(s) using Real-time Transport Protocol (RTP), ITU-T H.323 protocol, and the like.

Terminal controller 112 of base unit 104 connects one or more media terminals 102 with each of the concurrent media sessions (step 210). In particular, switch logic 122 of terminal controller 112 can use terminal map 128 to associate one or more media terminals 102 with each of the media sessions (step 212). For example, each call session can be associated with an Internet Protocol (IP) address of base unit 104, while each media session can be associated with a software port number. Terminal map 128 can associate media terminals 102 with the media sessions using a table that associates identifiers of media terminals 102, for example such as media access control (MAC) or Internet protocol (IP) addresses, with the port numbers of the media sessions. Table 1 below shows an example terminal map table.

TABLE 1

| Media Terminal (IP address) | Media session (port number) |
|---|---|
| 192.168.192.1 | 1234 |
| 192.168.192.2 | 1235 |
| 192.168.192.3 | 1236 |
| 192.168.192.4 | 1237 |

Referring to Table 1, four concurrent media sessions have been associated with four different media terminals. For example, the media terminal 102 having IP address 192.168.192.1 is associated with the media session on port number 1234. Of course, one media terminal can be associated with multiple media sessions, for example for conference call, to play music during a call, and the like.

Referring again to FIG. 2, switch fabric 124 connects media terminals 102 with the media sessions according to terminal map 128 (step 214). The connection to each media terminal 102 is completed through channel controller 126 of terminal controller 112.

Terminal map 128 can be dynamic, and can be populated according to mapping rules, which can be provisioned with base unit 104, modified by users through media terminals 102, and the like. For example, the mapping rules can specify that an inbound call received when no other calls are taking place should be connected to media terminal 1, while inbound calls received during another call should be connected to media terminal 2, while also providing a call waiting indication to media terminal 1.

Figure 3B:
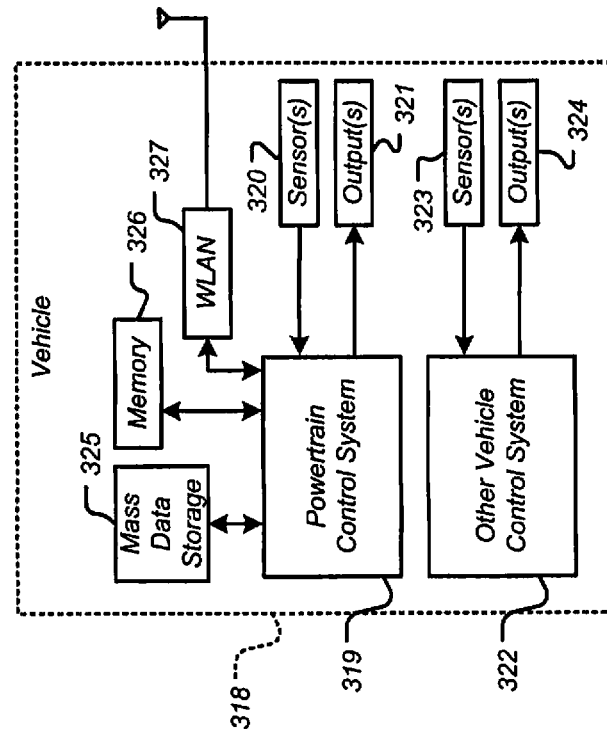
FIGS. 3A-3E show various exemplary implementations.
Figure 3A:
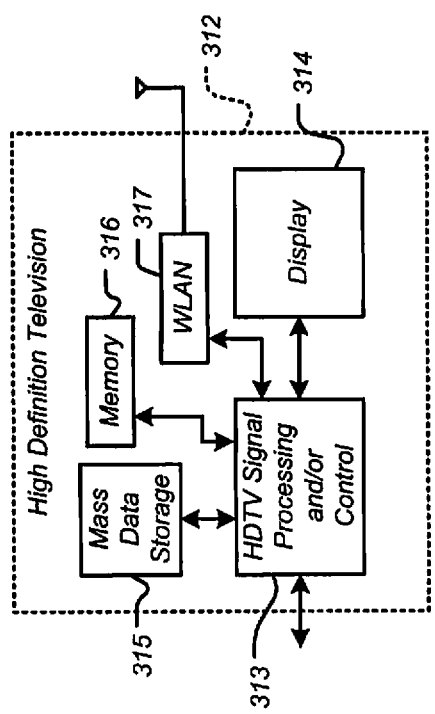

FIGS. 3A-3E show various exemplary implementations. Referring now to FIG. 3A, an embodiment can be implemented in a high definition television (HDTV) 312. An embodiment may implement either or both signal processing and/or control circuits, which are generally identified in FIG. 3A at 313, a WLAN interface 317 and/or mass data storage 315 of the HDTV 312. The HDTV 312 receives HDTV input signals in either a wired or wireless format and generates HDTV output signals for a display 314. In some implementations, signal processing circuit and/or control circuit 313 and/or other circuits (not shown) of the HDTV 312 may process data, perform coding and/or encryption, perform calculations, format data and/or perform any other type of HDTV processing that may be required.

The HDTV 312 may communicate with mass data storage 315 that stores data in a nonvolatile manner such as optical and/or magnetic storage devices. The HDD may be a mini HDD that includes one or more platters having a diameter that is smaller than approximately 1.8". The HDTV 312 may be connected to memory 316 such as RAM, ROM, nonvolatile memory such as flash memory and/or other suitable electronic data storage. The HDTV 312 also may support connections with a WLAN via a WLAN network interface 317.

Referring now to FIG. 3B, an embodiment implements a control system of a vehicle 318, a WLAN interface 327 and/or mass data storage 325 of the vehicle control system. In some implementations, an embodiment implements a powertrain control system 319 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

An embodiment may also be implemented in other control systems 322 of the vehicle 318. The control system 322 may likewise receive signals from input sensors 323 and/or output control signals to one or more output devices 324. In some implementations, the control system 322 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 319 may communicate with mass data storage 325 that stores data in a nonvolatile manner. The mass data storage 325 may include optical and/or magnetic storage devices including HDDs and/or DVD drives. The HDD may be a mini HDD that includes one or more platters having a diameter that is smaller than approximately 1.8". The powertrain control system 319 may be connected to memory 326 such as RAM, ROM, nonvolatile memory such as flash memory and/or other suitable electronic data storage.

The powertrain control system 319 also may support connections with a WLAN via a WLAN network interface 327. The control system 322 may also include mass data storage, memory and/or a WLAN interface (all not shown).

Figure 3C:
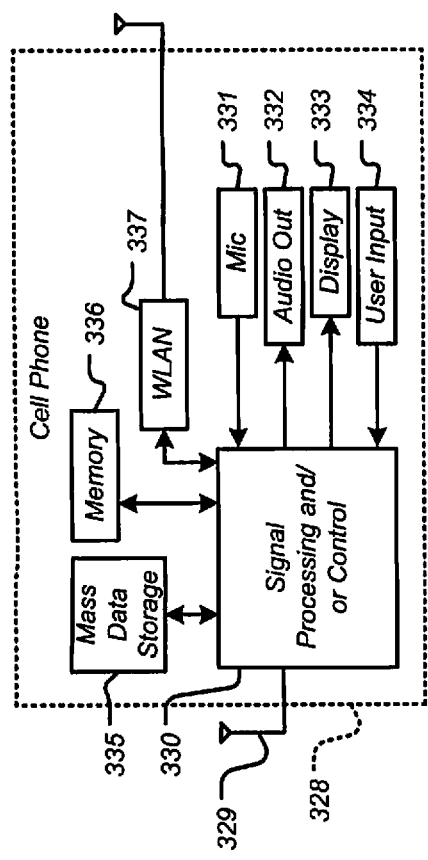

Referring now to FIG. 3C, an embodiment can be implemented in a cellular phone 328 that may include a cellular antenna 329. An embodiment may implement either or both signal processing and/or control circuits, which are generally identified in FIG. 3C at 330, a WLAN interface 337 and/or mass data storage 335 of the cellular phone 328. In some implementations, the cellular phone 328 includes a microphone 331, an audio output 332 such as a speaker and/or audio output jack, a display 333 and/or user input device 334 such as a keypad, pointing device, and/or voice actuation, for example. The signal processing and/or control circuits 330 and/or other circuits (not shown) in the cellular phone 328 may process data, perform coding and/or encryption, perform calculations, format data and/or perform other cellular phone functions.

The cellular phone 328 may communicate with mass data storage 335 that stores data in a nonvolatile manner such as optical and/or magnetic storage devices including HDDs and/or DVD drives. The HDD may be a mini HDD that includes one or more platters having a diameter that is smaller than approximately 1.8". The cellular phone 328 may be connected to memory 336 such as RAM, ROM, nonvolatile memory such as flash memory and/or other suitable electronic data storage. The cellular phone 328 also may support connections with a WLAN via a WLAN network interface 337.

Figure 3D:
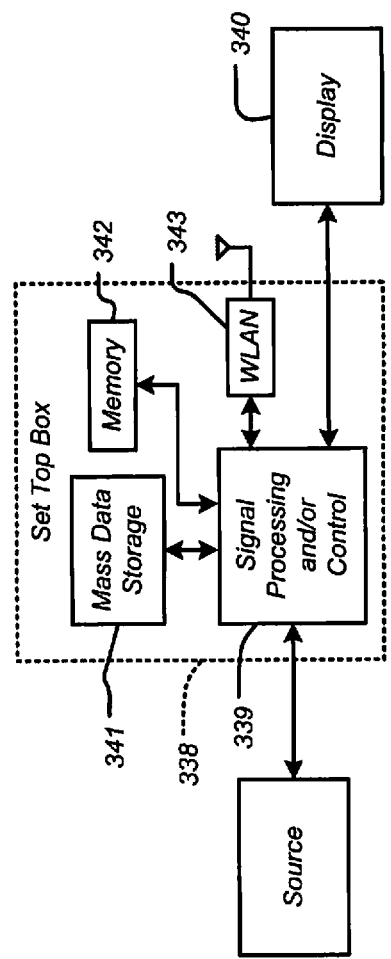

Referring now to FIG. 3D, an embodiment can be implemented in a set top box 338. An embodiment may implement either or both signal processing and/or control circuits, which are generally identified in FIG. 3D at 339, a WLAN interface 343 and/or mass data storage 341 of the set top box 338. The set top box 338 receives signals from a source such as a broadband source and outputs standard and/or high definition audio/video signals suitable for a display 340 such as a television, a monitor and/or other video and/or audio output devices. The signal processing and/or control circuits 339 and/or other circuits (not shown) of the set top box 338 may process data, perform coding and/or encryption, perform calculations, format data and/or perform any other set top box functions.

The set top box 338 may communicate with mass data storage 343 that stores data in a nonvolatile manner. The mass data storage 343 may include optical and/or magnetic storage devices including HDDs and/or DVD drives. The HDD may be a mini HDD that includes one or more platters having a diameter that is smaller than approximately 1.8". The set top box 338 may be connected to memory 342 such as RAM, ROM, nonvolatile memory such as flash memory and/or other suitable electronic data storage. The set top box 338 also may support connections with a WLAN via a WLAN network interface 343.

Figure 3E:
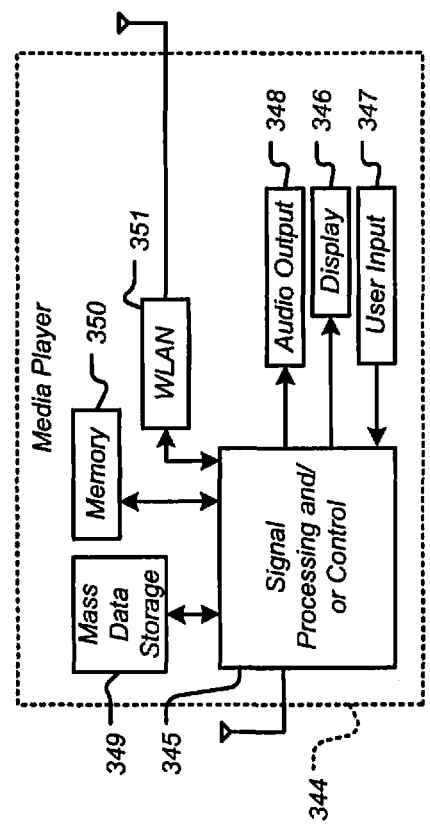

Referring now to FIG. 3E, an embodiment can be implemented in a media player 344. An embodiment may implement either or both signal processing and/or control circuits, which are generally identified in FIG. 3E at 345, a WLAN interface 351 and/or mass data storage 349 of the media player 344. In some implementations, the media player 344 includes a display 346 and/or a user input 347 such as a keypad, touchpad and the like. In some implementations, the media player 344 may employ a graphical user interface (GUI) that typically employs menus, drop down menus, icons and/or a point-and-click interface via the display 346 and/or user input 347. The media player 344 further includes an audio output 348 such as a speaker and/or audio output jack. The signal processing and/or control circuits 345 and/or other circuits (not shown) of the media player 344 may process data, perform coding and/or encryption, perform calculations, format data and/or perform any other media player functions.

The media player 344 may communicate with mass data storage 349 that stores data such as compressed audio and/or video content in a nonvolatile manner. In some implementations, the compressed audio files include files that are compliant with MP3 format or other suitable compressed audio and/or video formats. The mass data storage 349 may include optical and/or magnetic storage devices including HDDs and/or DVD drives. The HDD may be a mini HDD that includes one or more platters having a diameter that is smaller than approximately 1.8". The media player 344 may be connected to memory 350 such as RAM, ROM, low latency nonvolatile memory such as flash memory and/or other suitable electronic data storage. The media player 344 also may support connections with a WLAN via a WLAN network interface 351. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:
1. A cordless telephone base unit comprising:
   a first network controller that establishes a plurality of concurrent call sessions for a single voice call account with a service provider over the Internet, wherein each of the concurrent call sessions includes at least one media session, and wherein each of the media sessions has a corresponding software port number;

a second network controller that wirelessly communicates with a plurality of cordless telephones, wherein each of the plurality of cordless telephones has a corresponding Internet Protocol (IP) address; and a terminal controller that connects each of the media sessions to one or more of the plurality of cordless telephones, wherein the terminal controller comprises a switch logic that implements a terminal map, wherein the terminal map associates the corresponding IP address of each of the plurality of cordless telephones with the corresponding software port numbers of one or more of the media sessions, and a switch fabric that connects each of the plurality of cordless telephones with one or more of the media sessions according to the terminal map, wherein the terminal map specifies that in response to a first inbound call being received while no other calls are traversing the first network controller, the first inbound call is connected to a first cordless telephone of the plurality of cordless telephones, and in response to a second inbound call being received while the first inbound call is connected to the first cordless telephone, (i) the second inbound call is connected to a second cordless telephone of the plurality of cordless telephones, and (ii) a call waiting indicator is provided to the first cordless telephone.

2. The cordless telephone base unit of claim 1:
wherein at least one of the concurrent call sessions includes a voice over Internet Protocol (VoIP) session.

3. The cordless telephone base unit of claim 1, wherein the first network controller comprises:

a signaling session controller that establishes a respective signaling session for each of the concurrent call sessions; and a media session controller that establishes the media sessions.

4. The cordless telephone base unit of claim 1, wherein the second network controller comprises at least one of:

a wireless local area network (WLAN) controller that communicates with the plurality of cordless telephones over a WLAN; or a wireless personal area network (WPAN) controller that communicates with the plurality of cordless telephones over a WPAN.

5. The cordless telephone base unit of claim 1, wherein each of the media sessions comprises at least one of:

a voice session;
a music session; or
a video session.

6. A method of operating a cordless telephone base unit, the method comprising:

establishing a plurality of concurrent call sessions for a single voice call account with a service provider over the Internet, wherein each of the concurrent call sessions includes at least one media session, and wherein each of the media sessions has a corresponding software port number;

wirelessly communicates with a plurality of cordless telephones, wherein each of the plurality of cordless telephones has a corresponding Internet Protocol (IP) address;

implementing a terminal map, wherein the terminal map associates the corresponding IP address of each of the plurality of cordless telephones with the corresponding software port numbers of one or more of the media sessions; and connecting each of the plurality of cordless telephones with one or more of the media sessions according to the terminal map, including in response to a first inbound call being received while no other calls are traversing the cordless telephone base unit, connecting the first inbound call to a first cordless telephone of the plurality of cordless telephones, and in response to a second inbound call being received while the first inbound call is connected to the first cordless telephone, (i) connecting the second inbound call to a second cordless telephone of the plurality of cordless telephones and (ii) providing a call waiting indicator to the first cordless telephone.

7. The method of claim 6:
wherein at least one of the concurrent call sessions includes a voice over Internet Protocol (VoIP) session.

8. The method of claim 6, further comprising:
establishing a respective signaling session for each of the concurrent call sessions; and
establishing the media sessions.

9. The method of claim 6, wherein the communicating with the plurality of cordless telephones comprises at least one of:
communicating with the plurality of cordless telephones over a wireless local area network (WLAN); or
communicating with the plurality of cordless telephones over a wireless personal area network (WPAN).

10. The method of claim 6, wherein each of the media sessions comprises at least one of:
a voice session;
a music session; or
a video session.

* * * * *